US012646850B2

(12) United States Patent
Bezawada et al.

(10) Patent No.: US 12,646,850 B2
(45) Date of Patent: Jun. 2, 2026

(54) COMPACT HELICAL ANTENNA WITH PLASTIC SUPPORT FOR LOW FREQUENCY RF COMMUNICATION

(71) Applicant: Honeywell International Inc., Charlotte, NC (US)

(72) Inventors: Murali Krishna Bezawada, Hyderabad (IN); Manasa Chinnam, Sangareddy (IN); Piyush Uday Gangwal, Pune (IN); Steven Osborne, Nottingham (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 217 days.

(21) Appl. No.: 18/535,626

(22) Filed: Dec. 11, 2023

(65) Prior Publication Data

US 2025/0192441 A1 Jun. 12, 2025

(51) Int. Cl.
*H01Q 1/36* (2006.01)
*H01Q 11/08* (2006.01)
*G01F 15/063* (2022.01)

(52) U.S. Cl.
CPC ........... *H01Q 11/08* (2013.01); *G01F 15/063* (2013.01)

(58) Field of Classification Search
CPC ......... H01Q 1/22; H01Q 1/2233; H01Q 11/08
See application file for complete search history.

(56) References Cited

U.S. PATENT DOCUMENTS

| | | | |
|---|---|---|---|
| 5,910,790 A | 6/1999 | Ohmuro et al. | |
| 7,639,203 B2 | 12/2009 | Hao | |
| 9,105,972 B2 | 8/2015 | Webb | |
| 9,240,629 B2 * | 1/2016 | Kim ..................... | H01Q 1/3275 |

(Continued)

FOREIGN PATENT DOCUMENTS

| | | |
|---|---|---|
| CN | 102769168 A | 11/2012 |
| CN | 106329134 A | 4/2019 |

(Continued)

OTHER PUBLICATIONS

"Wize Technology," Wikipedia, https://en.wikipedia.org/wiki/Wize_technology, dowloaded Nov. 15, 2023, 6:36 PM.

(Continued)

*Primary Examiner* — Tho G Phan
(74) *Attorney, Agent, or Firm* — Ingrassia, Fisher & Lorenz LLP

(57) ABSTRACT

An antenna apparatus and method of operating the antenna apparatus, can include a helical antenna comprising a helical portion raised from a printed circuit board to optimize gain and bandwidth, wherein the helical portion incorporates a limited number of turns, which facilitate control over the dimensions of the helical antenna. An antenna support can be provided, which can maintain dimensional consistency with respect to the helical antenna. The antenna support can facilitate achievement of target performance parameters for the antenna apparatus. In addition, the elevated helical portion can be configured to enhance the gain and the bandwidth without compromising the overall dimensions of the helical antenna. In some embodiments, the helical antenna may be formed from plastic.

20 Claims, 5 Drawing Sheets

(56) References Cited

U.S. PATENT DOCUMENTS

| | | | |
|---|---|---|---|
| 9,929,772 B2 * | 3/2018 | Rose | H04B 1/0475 |
| 10,038,235 B2 * | 7/2018 | DiNallo | H01Q 21/30 |
| 10,044,107 B2 | 8/2018 | Elliot et al. | |
| 10,194,220 B2 * | 1/2019 | Korva | G01D 4/02 |
| 10,230,159 B2 * | 3/2019 | Zachara | H01Q 11/08 |
| 11,349,218 B2 * | 5/2022 | Thyagarajan | H01Q 11/08 |
| 11,437,726 B2 * | 9/2022 | Khait | H01Q 11/08 |
| 2022/0285821 A1 | 9/2022 | Ragan | |

FOREIGN PATENT DOCUMENTS

| | | | |
|---|---|---|---|
| EP | 2234198 A1 | 9/2010 | |
| WO | 2017028955 A1 | 2/2017 | |

OTHER PUBLICATIONS

"Effective Radiated Power," Wikipedia, https://en.wikipedia.org/wiki/Effective_radiated_power, dowloaded Nov. 14, 2023, 2:39 PM.

Paul Record and Komsan Kanja, "A Compact VHF Antenna for Smart Meters", Progress In Electromagnetics Research Symposium Proceedings, Jul. 2015.

Tariq Rahim, "An overview of helix antenna and its design," Feb. 2015.

* cited by examiner

170

177

184

173

182

171

175

170

102

177

170

102

177

COMPACT HELICAL ANTENNA WITH PLASTIC SUPPORT FOR LOW FREQUENCY RF COMMUNICATION

TECHNICAL FIELD

Embodiments are generally related to the field of wireless technologies including radio frequency (RF) devices, methods, and systems. Embodiments further relate to helical antennas and water meters which incorporate the use of such antennas.

BACKGROUND

Water meters are often equipped with wireless communication devices utilizing low frequencies, such as 169 MHz, for optimal performance in pits. This frequency choice is preferred due to its lower attenuation and better signal penetration. However, the challenge arises in accommodating larger antennas typically required for low frequencies within the confined space of meter pits.

To address this, helical antennas are employed to compress the antenna's height, allowing it to fit in the restricted space of the pit. Despite the advantages, the use of helical antennas introduces sensitivity to dimensions, particularly pitch, which can impact bandwidth and gain.

The heightened sensitivity to dimensions poses challenges in fully automated manufacturing processes, leading to variations in antenna dimensions from one unit to another. This inconsistency can result in fluctuations in radio frequency (RF) performance among different antennas.

To overcome these issues, there is a need for a compact low-frequency antenna design that is easy to manufacture and less sensitive to dimensional changes. While some manufacturers have utilized helical antennas for low-frequency wireless communication in water meters, their designs often suffer from poor pitch control, making them challenging to produce effectively.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved antenna apparatus and methods of configuring and operating such devices.

It is another aspect of the embodiments to provide for an improved helical antenna.

It is a further aspect of the embodiments to provide for an antenna support for use with a helical antenna.

It is yet another aspect of the embodiments to provide for a helical antenna that can be adapted for use with a water metering device.

The aforementioned aspects and other objectives can now be achieved as described herein. In an embodiment, an antenna apparatus can include a helical antenna comprising a helical portion raised from a printed circuit board to optimize gain and bandwidth, wherein the helical portion incorporates a limited number of turns, which provide control over the dimensions of the helical antenna.

An embodiment can include an antenna support that maintains dimensional consistency with respect to the helical antenna, wherein the antenna support facilitates achievement of target performance parameters for the antenna apparatus.

In an embodiment, the antenna support can comprise plastic.

In an embodiment, the elevated helical portion can be configured to enhance gain and bandwidth without compromising the overall dimensions of the helical antenna.

In an embodiment, the antenna support can be structured to ensure dimensional stability to meet predetermined performance criteria for the helical antenna.

In an embodiment, an antenna support can maintain dimensional consistency with respect to the helical antenna, wherein the antenna support facilitates achievement of target performance parameters for the antenna apparatus, and the elevated helical portion can be configured to enhance gain and bandwidth without compromising the overall dimensions of the helical antenna.

In an embodiment, an antenna support can facilitate dimensional consistency with respect to the helical antenna, wherein the antenna support facilitates achievement of target performance parameters for the antenna apparatus, and the antenna support can be structured to ensure dimensional stability to meet predetermined performance criteria for the helical antenna.

In an embodiment, the helical antenna can be adapted for use with a low-power wide-area network (LPWAN) application.

In an embodiment, the LPWAN application can comprise a water metering applications.

In an embodiment, an antenna apparatus can include: a helical antenna comprising a helical portion raised from a printed circuit board to optimize gain and bandwidth, wherein the helical portion incorporates a limited number of turns, which provide control over the dimensions of the helical antenna; and an antenna support that maintains dimensional consistency with respect to the helical antenna, wherein the antenna support facilitates achievement of target performance parameters for the antenna apparatus.

In an embodiment, a method of operating an antenna apparatus, can involve: optimizing a gain and a bandwidth with an antenna apparatus comprising a helical antenna that includes a helical portion raised from a printed circuit board, wherein the helical antenna comprises antenna dimensions controlled by a limited number of turns in the helical antenna; and operating the antenna apparatus with the optimized gain and bandwidth.

An embodiment of the method can further involve providing an antenna support that maintains dimensional consistency with respect to the helical antenna, wherein the antenna support facilitates achievement of target performance parameters for the antenna apparatus.

In an embodiment of the method, the elevated helical portion can be configured to enhance the gain and the bandwidth without compromising the dimensions of the helical antenna.

In an embodiment of the method, the antenna support can be structured to ensure dimensional stability to meet predetermined performance criteria for the helical antenna.

An embodiment of the method can further involve adapting the helical antenna for use with a low-power wide-area network (LPWAN) application.

In an embodiment of the method, the LPWAN application may be a water metering application.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

In the drawings described and illustrated herein, identical or similar parts and elements are generally indicated by identical reference numerals.

DETAILED DESCRIPTION

Figure 1:
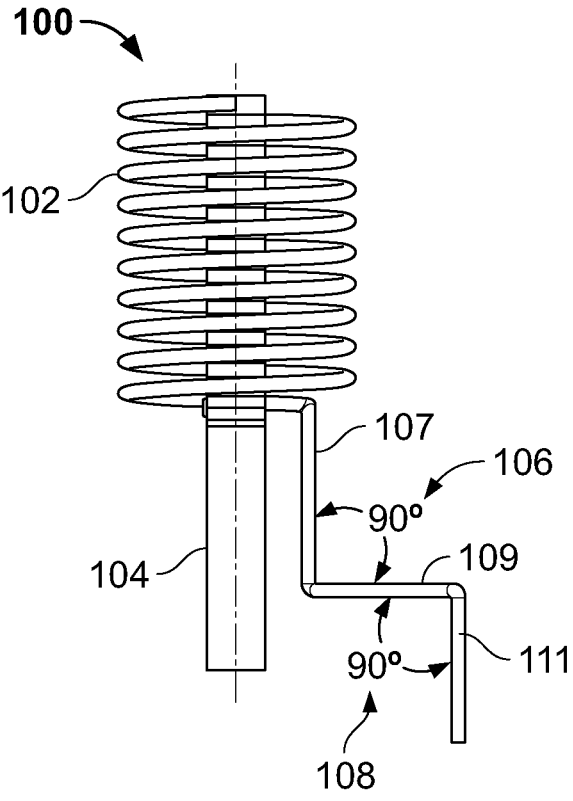
FIG. 1 illustrates a side view of an antenna apparatus which includes a helical antenna and an antenna support, in accordance of an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be discussed in more detail herein, the embodiments relate to an antenna apparatus and method of operating the antenna apparatus and can include a helical antenna comprising a helical portion raised from a printed circuit board to optimize gain and bandwidth. The helical portion incorporates a limited number of turns, facilitating control over the dimensions of the helical antenna. An antenna support can be provided to maintain dimensional consistency with respect to the helical antenna. The antenna support facilitates the achievement of target performance parameters for the antenna apparatus. Additionally, the elevated helical portion can be configured to enhance the gain and bandwidth without compromising the overall dimensions of the helical antenna. In some embodiments, the helical antenna may be formed from plastic.

The embodiments further relate to a straightforward, cost-effective, and easy-to-assemble solution for a helical antenna. This antenna design can allow for the adjustment of various parameters such as space, height, diameter, placement, angle, and distance. Specifically, this solution enables the control of the antenna pitch or turn, configuring the antenna to suit different requirements. For example, the embodiments can be applied to a helical antenna detached from a printed circuit board (PCB) or other implementations.

The helical portion of the antenna can be raised from the PCB to enhance gain and bandwidth. Simultaneously, fewer turns can be employed to manage the overall dimensions effectively. Additionally, a novel antenna support system is introduced to ensure dimensional consistency, thereby meeting the desired performance targets. This solution is versatile and can be adapted to various helical antenna applications, maintaining a consistent pitch during shipment and throughout the product's lifespan.

FIG. 1 illustrates a side view of an antenna apparatus 100 which includes a helical antenna 102 and an antenna support 104, in accordance of an embodiment. The helical antenna 102 can be configured in the shape of a coil and can include an extended portion composed of sections 108, 109, and 111, wherein sections 107 and 109 form an angle 106 of 90 degrees and sections 109 and 111 similarly form an angle 109 of 90 degrees.

The helical antenna 102 can be configured in manner in which the helical portion of the helical antenna is elevated from a printed circuit board (PCT) to attain a higher gain and bandwidth while simultaneously requiring fewer coil turns to control dimension. The antenna support 104 provides a unique and innovative design that allows the antenna apparatus to achieve dimensional consistency for the helical antenna 102 while meeting performance goals for the antenna apparatus 100. This solution can be used for any helical antennas to maintain constant pitch during shipment and during the entire life of the antenna product.

Figure 2:
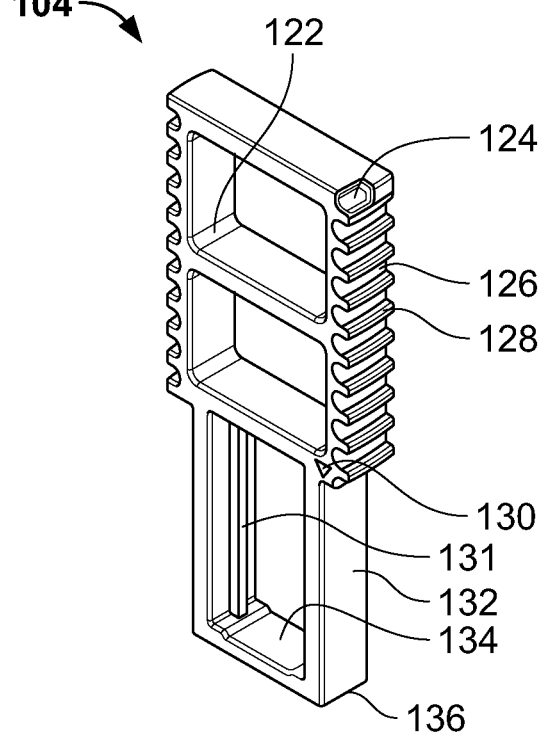
FIG. 2 illustrates a perspective view of an antenna support, which can be implemented in accordance with an embodiment.

FIG. 2 illustrates a perspective view of the antenna support 104, in accordance with an embodiment. The antenna support 104 can include a flat base 136 located at the bottom of the antenna support 104. In addition, the antenna support 104 can incorporate a cutout 134 formed on the flat base 136 and one or more lugs such as lug 132, which rises from the antenna base 136. In addition, vertical ribs 131 can be formed in the walls of the antenna support 104 along the interior portion of the lugs and surrounding the cutout 134.

The antenna support 104 also can include a start point indictor 130 along which the coils of the helical antenna 102 are placed. The upper and exterior portions of the antenna support 104 can also include one or more chamfers such as, for example, chamfer 128 and one or more pitch profiles such as pitch profile 126. Note that the term 'chamfer' as utilized herein can relate to a transitional edge between two faces or portions of an object and may also relate to a surface at the end of a thread. The antenna support 104 can further include a stopper 124 and one or middle ribs with a fillet such as rib 122 shown in FIG. 2.

In some embodiments, the antenna support 104 may be configured from a plastic material, allowing the antenna support to function 104 as a plastic support. To strength the antenna support at the top portion and the bottom portion of the antenna support 104, the antenna support 104 should have a sufficient number of vertical ribs, horizontal ribs, and fillets, to ensure that the antenna support 104 is robust and will not bend during handling and or because of antenna stress.

Precise and tall lugs can help to maintain the antenna distance from a PCB while also facilitating in antenna orientation and placement while soldering. The narrow width of the antenna support 104 can allow the antenna support 104 to be placed easily inside the helical antenna 102 at the time of assembly, with no trial error required. The flat base 136 can rest on a PCBA/metal shield and intentional cutouts such as cutout 134 on the flat base 136 can be filled after a potting application to provide for a permanent fix. The configuration and/or structure of the antenna support 104 can also prevent a rattling sound due to vibration that may occur when the antenna apparatus 100 hits against a plastic cover. That is, the design and arrangement of the antenna support 104 can minimize any rattling noise caused by vibrations. This is particularly relevant in situations where the antenna apparatus 100 makes contact with the plastic cover.

Figures 3, 4:
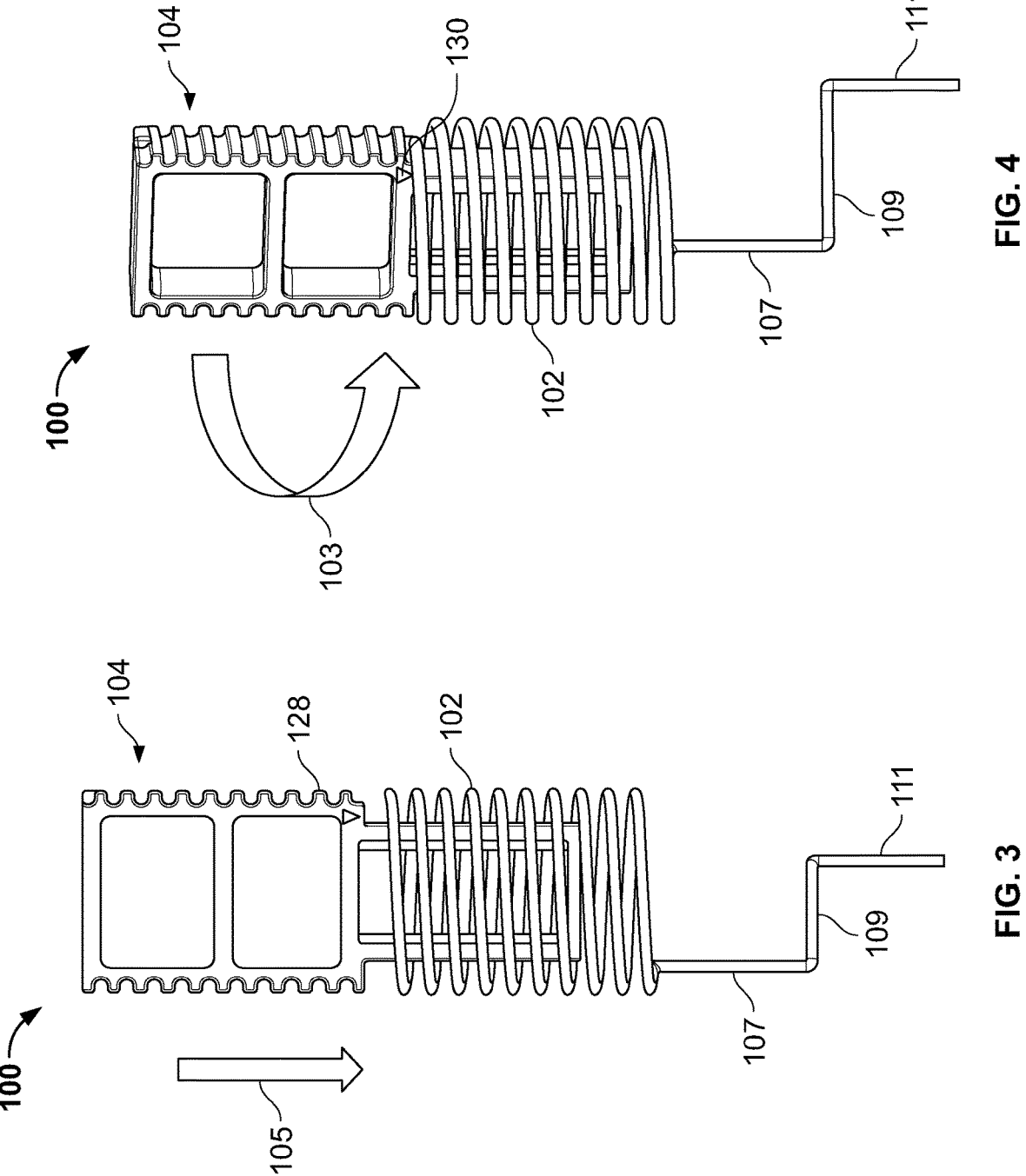
FIG. 3 illustrates a schematic diagram depicting an antenna assembly step involving insertion of the antenna support into the helical antenna, in accordance with an embodiment.
FIG. 4 illustrates a schematic diagram depicting an antenna assembly step involving rotating of the antenna support to coil with the helical antenna, in accordance with an embodiment.

FIG. 3 illustrates a schematic diagram depicting an antenna assembly step involving insertion of the antenna support 104 into the helical antenna 102, in accordance with an embodiment. Arrow 105 shown in FIG. 3 indicates the direction of insertion of the antenna support 104 into the helical antenna 102.

FIG. 4 illustrates a schematic diagram depicting an antenna assembly step involving rotating of the antenna support 104 to coil with the helical antenna 102, in accordance with an embodiment. The arrow 103 shown in FIG. 4 indicates that the antenna support 104 can be rotated to coil with the helical antenna 102 starting from the indication support location 113.

Figures 5, 6A, 6B:
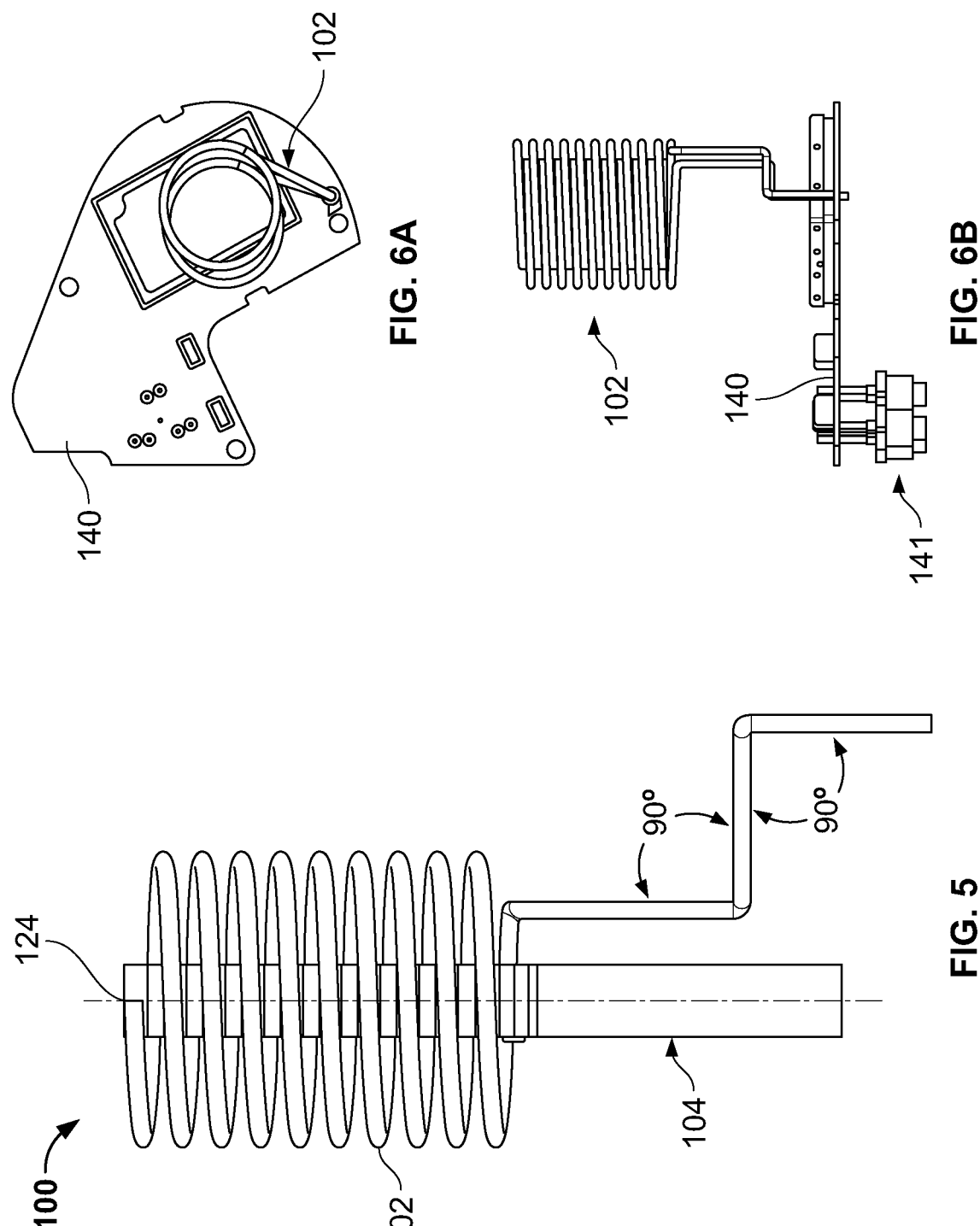
FIG. 5 illustrates a schematic diagram depicting an antenna assembly step involving rotation of the helical antenna until a stopper ends on the antenna support, in accordance with an embodiment.
FIG. 6A and FIG. 6B illustrates schematic diagrams depicting positioning of the helical antenna on a printed circuit board (PCB), in accordance with an embodiment.

FIG. 5 illustrates a schematic diagram depicting an antenna assembly step involving rotation of the helical antenna 102 until the stopper 124 ends on the antenna support 104, in accordance with an embodiment.

FIG. 6A and FIG. 6B illustrates schematic diagrams depicting positioning of the helical antenna 103 on a printed circuit board (PCB) 140, in accordance with an embodiment. The configurations shown in FIG. 6A and FIG. 6B also demonstrate the "new" position versus the "old" position. As shown in FIG. 6B, additional electronic components 141 may extend from and below the PCB 140.

Figures 7, 8, 9:
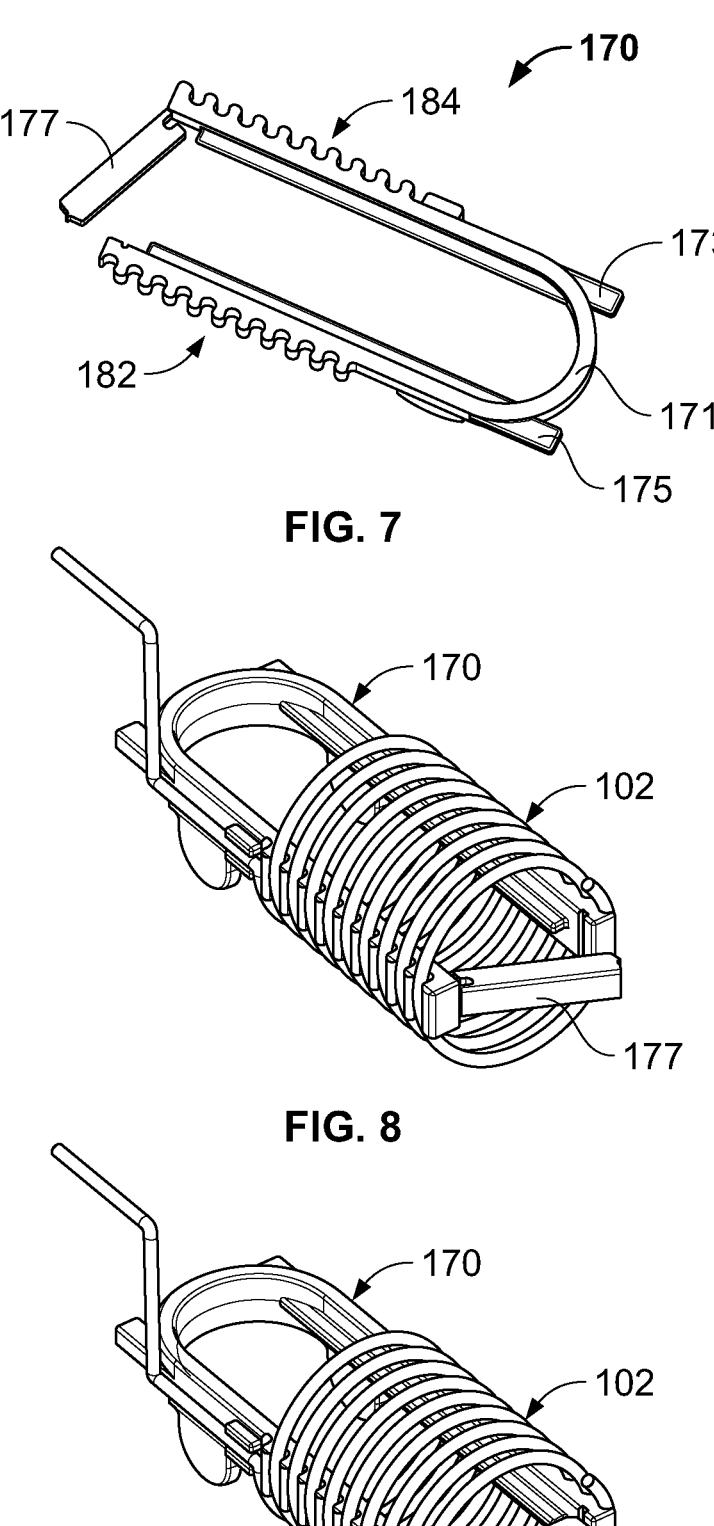
FIG. 7 illustrates a perspective view of an antenna support, in accordance with an embodiment.
FIG. 8 illustrates a perspective view of the antenna support with an end piece in an open position and with the antenna support engaged with the helical antenna, in accordance with an embodiment.
FIG. 9 illustrates a perspective view of the antenna support with an end piece in a closed position and with the antenna support engaged with the helical antenna, in accordance with an embodiment.

FIG. 7 illustrates a perspective view of an antenna support 170, in accordance with an embodiment. The antenna support 170 is an alternative version of the antenna support 104 described above. The antenna support 170 generally can include ribbed sections 182 and 184 located opposite one another. The antenna support 170 can also include a curved portion 173 that extends from the ribbed section 184 toward the ribbed section 182. The ribbed section 182 can engage with an elongated section 175 while the ribbed section 184 can engage with an elongated section 173. The elongated section 175 and the elongated section 173 are also located opposite one another. The antenna support 170 can further include an end piece 177 that may be opened or closed. The end piece 177 can function as a moveable section for the antenna support 170.

FIG. 8 illustrates a perspective view of the antenna support 170 with the end piece 177 in an open position and with the antenna support engaged 170 engaged with the helical antenna 102, in accordance with an embodiment.

FIG. 9 illustrates a perspective view of the antenna support 170 with the end piece 177 in a closed position and with the antenna support 170 engaged with the helical antenna 102, in accordance with an embodiment. FIG. 7, FIG. 8 and FIG. 9 thus illustrate an alternative antenna support 170, which can be used to control the dimensions of the helical antenna 102 and also provides an easy method of assembly and furthermore does not require any special manufacturing equipment.

Figure 10:
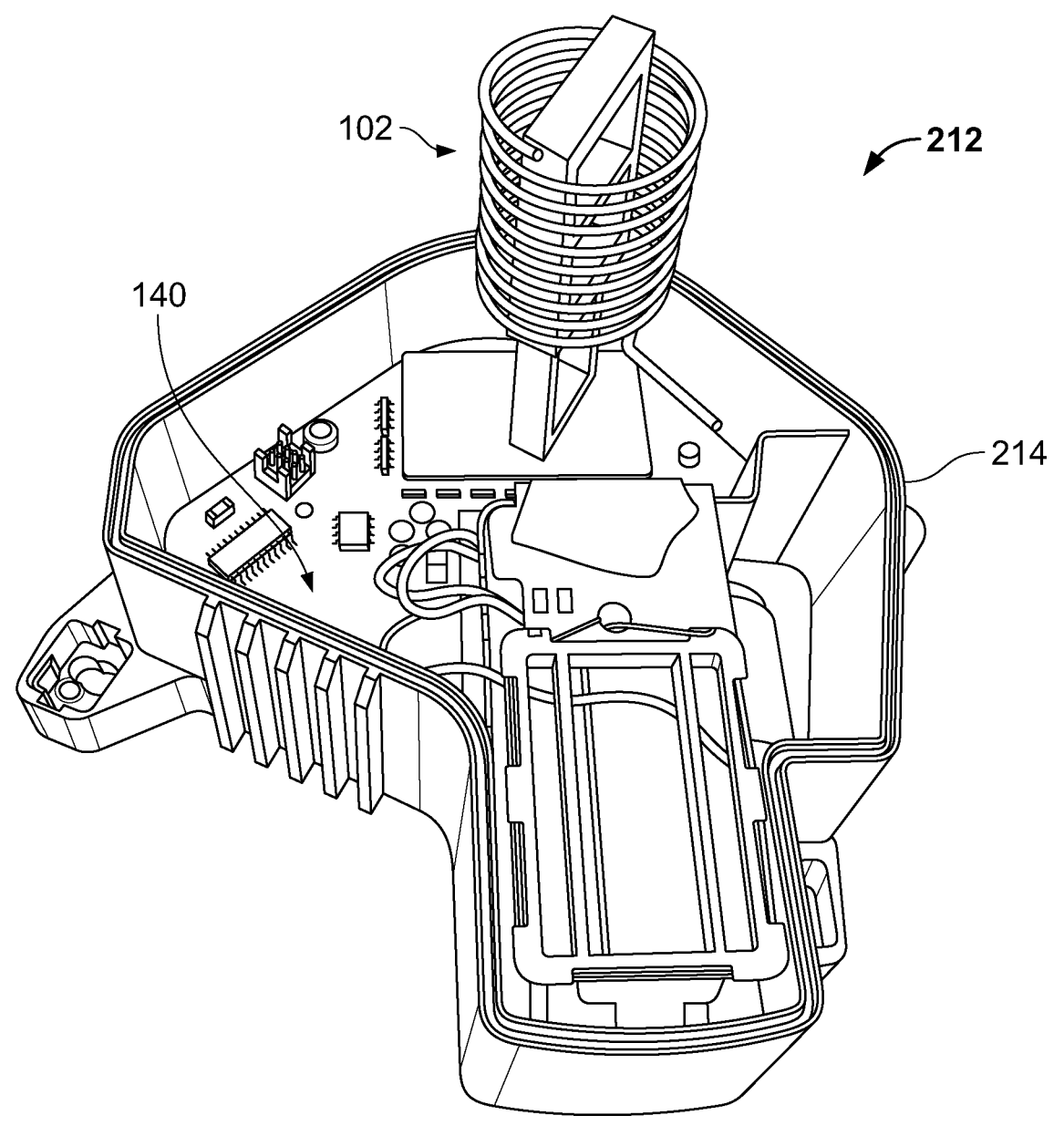
FIG. 10 illustrates a graph depicting example antenna sample results and an image of a helical antenna implementation, in accordance with an embodiment.

FIG. 10 illustrates an image 212 of a helical antenna implementation, in accordance with an embodiment. The image 212 shown in FIG. 10 shows the helical antenna 102 in the context of an antenna device arrangement 214 including the previously discussed PCB. Note that in some embodiments, the helical antenna 102 can be employed in a water metering device installed below the ground (in pits, etc.) that can communicate with a lower frequency (e.g., 169 MHz), where the helical or coiled portion of the helical antenna 102 can be elevated from the PCB 140 to maintain a higher gain and bandwidth with fewer turns to control dimensions such as, for example, pitch etc.

The antenna apparatus 100 can be configured with the thin, light weight and robust plastic antenna support 102 with the compact helical antenna 102 capable of helping the antenna consistently resonate at a target frequency, providing dimensional consistency, and maintaining a constant pitch during shipment and during entire life of product. The plastic antenna supports (e.g., antenna supports 102, 170) can include helical profiles that may be configured to match the helical antenna 102 to ensure that the pitch, diameter and overall length is maintained for each antenna.

It should be appreciated that using the helical antenna 102 in low-power wide-area network (LPWAN) applications, specifically in the context of water metering solutions at the 169 MHz radio frequency, offers several advantages. For example, helical antennas are well-suited for lower frequencies like 169 MHz This frequency choice is common in LPWAN applications due to its better signal penetration and lower attenuation, making it ideal for scenarios where devices may be located in challenging environments such as water meter pits.

In addition, the helical antenna 102 can be designed to be compact, making it suitable for applications with spatial constraints, such as water meter pits. The helical structure of the helical antenna 102 allows for effective compression of the antenna's height, facilitating installation in confined spaces. Furthermore, the helical structure of the helical antenna 102 can contribute to improved signal penetration, particularly beneficial when dealing with obstacles or when the water meters are located in suboptimal environments like underground pits.

Despite the reduced size, the helical antenna 102 can provide enhanced gain, which is crucial for LPWAN applications requiring reliable long-range communication. This gain improvement contributes to a more robust and reliable connection in low-power scenarios. The helical design of the helical antenna 102 can offer improved directional characteristics, which can assist in minimizing interference from unwanted sources. This can be advantageous in environments with multiple devices communicating on the same frequency, ensuring a more reliable and interference-resistant network.

LPWAN technologies often require devices to operate on minimal power to extend battery life. The helical antenna 102 can be optimized to maintain efficient communication while consuming minimal power, aligning with the energy-efficient requirements of LPWAN applications. The helical antenna 102 can allow for customization of parameters such as pitch to adapt to specific environmental conditions. This flexibility is valuable in tailoring the antenna to the unique challenges presented by water metering applications, such as the depth and material of pits.

When properly designed and manufactured, the helical antenna 102 can provide consistent performance across different units, reducing variations in RF performance. This consistency is essential for maintaining reliable communication in LPWAN networks. The use of the helical antenna 102 in LPWAN applications at the 169 MHz radio frequency, particularly in water metering solutions, can offer the combination of a compact design, improved signal characteristics, and adaptability to challenging environments, which can contribute to reliable and efficient communications in low-power scenarios.

The use of a plastic antenna support such as antenna support 104 or antenna support 170 for the aforementioned helical antenna in low-power wide-area network (LPWAN) applications, especially in water metering solutions, also presents several advantageous and unique features. For example, plastic is inherently non-conductive, which is crucial for antennas. In environments where the helical antenna may be used (e.g., water meter pits), the non-conductive nature of plastic can assist in preventing interference or signal loss that might occur with conductive materials.

Plastic is resistant to corrosion, making it particularly suitable for applications in environments with moisture, such as water meter pits. This characteristic enhances the durability and longevity of the antenna support, ensuring stable performance over time. Plastic is generally lightweight, making it easier to handle during installation. This is particularly beneficial in scenarios where ease of deployment and maneuverability are essential, such as in the installation of water metering devices.

Furthermore, plastic is often more cost-effective to manufacture than other materials. Using plastic for the antenna support contributes to overall cost efficiency in production, which is a significant consideration for mass deployment of LPWAN-enabled devices like water meters. In addition, the use of plastic for the antenna support allows for a high degree of design flexibility. The antenna support can be molded into specific shapes to accommodate the helical antenna and meet the dimensional requirements of the water metering application. This flexibility facilitates the integration of the support structure with the overall design of the water metering system.

Plastic additionally can provide excellent insulation properties, which can be crucial when deploying electronic components such as the helical antenna 102. Plastic can help prevent electrical interference and ensure that the helical antenna can operate as intended, thereby maintaining signal integrity. Furthermore, plastic is resistant to environmental factors such as humidity and temperature variations. This adaptability is important in outdoor applications, such as water metering in various climates, which can ensure the long-term stability and reliability of the antenna support.

In addition, plastic components can be efficiently mass-produced using molding processes. This scalability is advantageous when manufacturing antennas and supports for widespread deployment, aligning with the needs of large-scale LPWAN applications like water metering networks. Plastic's non-conductive nature helps minimize radio frequency (RF) interference, contributing to improved signal quality and overall network reliability. This is crucial in LPWAN applications where interference can impact the effectiveness of communication over long distances.

The use of a plastic antenna support for the helical antenna 102 in LPWAN applications, particularly in water metering solutions, offers a combination of non-conductive properties, corrosion resistance, lightweight design, cost-effectiveness, and environmental adaptability. These features make plastic antenna supports advantageous and unique, addressing specific challenges associated with LPWAN deployment in diverse and often challenging environments.

Based on the foregoing, it can be appreciated that a number of embodiments including preferred and alternative embodiments, are disclosed herein. For example, in an embodiment an antenna apparatus can include a helical antenna comprising a helical portion raised from a printed circuit board to optimize gain and bandwidth, wherein the helical portion incorporates a limited number of turns, which provide control over the dimensions of the helical antenna.

An embodiment may also include or incorporate an antenna support that can maintain dimensional consistency with respect to the helical antenna, such that the antenna support can facilitate the achievement of target performance parameters for the antenna apparatus.

In an embodiment, the antenna support can comprise plastic.

In an embodiment, the elevated helical portion can be configured to enhance gain and bandwidth without compromising the overall dimensions of the helical antenna.

In an embodiment, the antenna support can be structured to ensure dimensional stability to meet predetermined performance criteria for the helical antenna.

In an embodiment, an antenna support can maintain dimensional consistency with respect to the helical antenna, wherein the antenna support facilitates achievement of target performance parameters for the antenna apparatus, and the elevated helical portion can be configured to enhance gain and bandwidth without compromising the overall dimensions of the helical antenna.

In an embodiment, an antenna support can facilitate dimensional consistency with respect to the helical antenna, wherein the antenna support facilitates achievement of target performance parameters for the antenna apparatus, and the antenna support can be structured to ensure dimensional stability to meet predetermined performance criteria for the helical antenna.

In an embodiment, the helical antenna can be adapted for use with a low-power wide-area network (LPWAN) application.

In an embodiment, the LPWAN application can comprise a water metering applications.

In an embodiment, an antenna apparatus can include: a helical antenna comprising a helical portion raised from a printed circuit board to optimize gain and bandwidth, wherein the helical portion incorporates a limited number of turns, which provide control over the dimensions of the helical antenna; and an antenna support that maintains dimensional consistency with respect to the helical antenna, wherein the antenna support facilitates achievement of target performance parameters for the antenna apparatus.

In an embodiment, a method of operating an antenna apparatus, can involve: optimizing a gain and a bandwidth with an antenna apparatus comprising a helical antenna that includes a helical portion raised from a printed circuit board, wherein the helical antenna comprises antenna dimensions controlled by a limited number of turns in the helical antenna; and operating the antenna apparatus with the optimized gain and bandwidth.

An embodiment of the method can further involve providing an antenna support that maintains dimensional consistency with respect to the helical antenna, wherein the antenna support facilitates achievement of target performance parameters for the antenna apparatus.

In an embodiment of the method, the elevated helical portion can be configured to enhance the gain and the bandwidth without compromising the dimensions of the helical antenna.

In an embodiment of the method, the antenna support can be structured to ensure dimensional stability to meet predetermined performance criteria for the helical antenna.

An embodiment of the method can further involve adapting the helical antenna for use with a low-power wide-area network (LPWAN) application.

In an embodiment of the method, the LPWAN application may be a water metering application.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An antenna apparatus, comprising:
a helical antenna comprising a helical portion raised from a printed circuit board to optimize gain and bandwidth, wherein the helical portion incorporates a limited number of turns, which provide control over the dimensions of the helical antenna; and
an antenna support that maintains dimensional consistency with respect to the helical antenna, wherein the antenna support facilitates achievement of target performance parameters for the antenna apparatus.

2. The antenna apparatus of claim 1, wherein the antenna support is rotatable to coil with the helical antenna.

3. The antenna apparatus of claim 1 wherein the antenna support comprises plastic.

4. The antenna apparatus of claim 1, wherein an elevated helical portion is configured to enhance gain and bandwidth without compromising the overall dimensions of the helical antenna.

5. The antenna apparatus of claim 1 wherein the antenna support is structured to ensure dimensional stability to meet predetermined performance criteria for the helical antenna.

6. The antenna apparatus of claim 1, wherein the antenna support comprises an upper portion and an exterior portion, wherein at least one of the upper portion and the exterior portion includes at least one chamfer.

7. The apparatus of claim 1 wherein the antenna support comprises a stopper and at least one middle rib with a fillet.

8. The apparatus of claim 1 wherein the helical antenna is adapted for use with a low-power wide-area network (LPWAN) application.

9. The apparatus of claim 8 wherein the LPWAN application comprises a water metering application.

10. An antenna apparatus, comprising:
a helical antenna comprising a helical portion raised from a printed circuit board to optimize gain and bandwidth, wherein the helical portion incorporates a limited number of turns, which provide control over the dimensions of the helical antenna; and
an antenna support that maintains dimensional consistency with respect to the helical antenna, wherein the antenna support facilitates achievement of target performance parameters for the antenna apparatus.

11. The antenna apparatus of claim 10 wherein the antenna support comprises plastic.

12. The antenna apparatus of claim 10, wherein an elevated helical portion is configured to enhance gain and bandwidth without compromising the overall dimensions of the helical antenna.

13. The apparatus of claim 10 wherein the helical antenna is adapted for use with a low-power wide-area network (LPWAN) application.

14. The apparatus of claim 13 wherein the LPWAN application comprises a water metering application.

15. A method of operating an antenna apparatus, the method comprising:
optimizing a gain and a bandwidth with an antenna apparatus comprising a helical antenna that includes a helical portion raised from a printed circuit board, wherein the helical antenna comprises antenna dimensions controlled by a limited number of turns in the helical antenna; and
operating the antenna apparatus with the optimized gain and bandwidth; and
providing an antenna support that maintains dimensional consistency with respect to the helical antenna, wherein the antenna support facilitates achievement of target performance parameters for the antenna apparatus.

16. The method of claim 15 wherein the antenna support is rotatable to coil with the helical antenna.

17. The method of claim 15 wherein an elevated helical portion is configured to enhance the gain and the bandwidth without compromising the dimensions of the helical antenna.

18. The method of claim 15 wherein the antenna support is structured to ensure dimensional stability to meet predetermined performance criteria for the helical antenna.

19. The method of claim 15 further comprising adapting the helical antenna for use with a low-power wide-area network (LPWAN) application.

20. The method of claim 19 wherein the LPWAN application comprises a water metering application.

\* \* \* \* \*